United States Patent [19]

Crane

[11] Patent Number: 4,635,767
[45] Date of Patent: Jan. 13, 1987

[54] INTERLOCK FOR THE THROTTLE AND PARKING BRAKE OF A VEHICLE

[75] Inventor: James W. Crane, Farmington, Ill.

[73] Assignee: Dresser Industries, Inc., Dallas, Tex.

[21] Appl. No.: 712,937

[22] Filed: Mar. 18, 1985

[51] Int. Cl.$^4$ .............................................. B60K 41/20
[52] U.S. Cl. ................... 192/3 M; 192/3 T; 192/3 TR; 74/846; 403/31; 403/32
[58] Field of Search ............... 74/846; 192/1, 3 S, 192/3 TR, 3 T, 3 M; 403/31, 32, 34

[56] References Cited

U.S. PATENT DOCUMENTS

| | | | |
|---|---|---|---|
| 2,642,165 | 6/1953 | Banker | 192/3 M |
| 3,111,210 | 11/1963 | Clifton | 192/3 T |
| 3,180,464 | 4/1965 | Ballard | 192/3 T |
| 3,331,477 | 7/1967 | Trifiletti et al. | 192/3 M |
| 3,426,624 | 2/1969 | Karig et al. | 192/3 M |
| 3,576,239 | 4/1971 | Hajek et al. | 192/3 T |
| 3,605,708 | 9/1971 | Jordan | 192/3 T |
| 3,912,056 | 10/1975 | Neal | 192/3 T |
| 4,119,118 | 10/1978 | Patel | 403/31 |

FOREIGN PATENT DOCUMENTS

| | | | |
|---|---|---|---|
| 1196121 | 11/1959 | France | 192/3 M |
| 1599418 | 9/1981 | United Kingdom | 403/31 |

Primary Examiner—Lawrence J. Staab
Assistant Examiner—Martin G. Belisario

[57] ABSTRACT

An interlock for the throttle and parking brake of a vehicle for retaining the engine at a predetermined speed until the parking brake is released. Includes a fluid supply conduit connected to the parking brake actuating mechanism. The supply of fluid to the parking brake actuating mechanism is controlled. The parking brake is maintained in the brake engaged position in the absence of fluid supply to the brake actuating mechanism. A linkage is interposed between a first member connected to a vehicle operated control mechanism, and a second member connected to an engine speed control mechanism. The link has a first operating mode for effectively connecting the first and second operating members in a second operating mode for effectively disconnecting the first and second operating members. The first member is placed in its first operating mode when fluid is supplied to the parking brake and is placed in second operating mode when the supply of fluid is discontinued.

8 Claims, 2 Drawing Figures

INTERLOCK FOR THE THROTTLE AND PARKING BRAKE OF A VEHICLE

BACKGROUND OF THE INVENTION

The present invention relates to an interlock for the throttle and parking brake of a vehicle and in particular, to a system for maintaining the vehicle engine at a predetermined speed when the parking brake is actuated, and for enabling the vehicle operator to control engine speed when the parking brake is deactuated.

It is well recognized that, in the operation of operator controlled vehicles, it is desirable to include a parking brake-throttle interlock. The inclusion of the described interlock feature prevents the operator or other persons from inadvertently attempting to move the vehicle while the parking brake is engaged. Essentially, the interlock maintains the engine used to drive the vehicle at a predetermined speed, for example, idle, when the parking brake is engaged.

There are several known systems which have heretofore been employed to protect against the unintentional application of power to a vehicle while the parking brake is engaged. One of the prior art systems utilizes a flexible connection, such as a Bowden-type cable, to activate an accelerator pedal jamming mechanism when the parking brake is applied. This type of system is rather difficult to install and relatively expensive to mount. Further, Bowden-type cables are susceptible to loss of effectiveness from kinking or corrosion caused by weather related elements. Other systems eliminate the use of the flexible connector by using rather complex systems of shafts, bellcranks, levers, and other rigid members. Not only are such systems complex, but they require a rather close proximity of the parking brake actuator and the control used to regulate engine speed. Essentially, such systems are limited to use on mechanically applied parking brakes and power control linkages, and are not applicable for use on hydraulic, pneumatic, or other remote controlled parking brake and power control systems.

Accordingly, it is an object of this invention to provide an interlock for the throttle and parking brake of a vehicle which may be utilized from pneumatic, hydraulic or other remote controlled parking brake and power control systems. It is a further object of the interlock design to reduce the complexity of the design and to minimize the interlock's susceptibility to damage.

SUMMARY OF THE INVENTION

These and other objects of the present invention are attained in a cable operated throttle for the primary engine of a vehicle having a parking brake interlock for retaining the engine at a predetermined speed until the parking brake is released, including parking brake actuating means, fluid supply means connected to the parking brake actuating means; means for controlling the supply of fluid to the parking brake actuating means; means for retaining the parking brake actuating means in a parking brake engaged position in the absence of fluid supplied thereto; the cable operated throttle including first operating means connected to a vehicle operated control mechanism and second operating means connected to an engine speed control mechanism; linkage means interposed between the first and second operating means including a first member having a first operating mode for effectively connecting the first and second operating means and a second operating mode for effectively disconnecting the first and second operating means; and means responsive to the supply of fluid to the parking brake actuating means to place the first member in its first operating mode when flow is supplied to the parking brake actuating means, and in the second operating mode when the supply of fluid is discontinued.

DESCRIPTION OF THE PREFERRED EMBODIMENT

Figure 1:
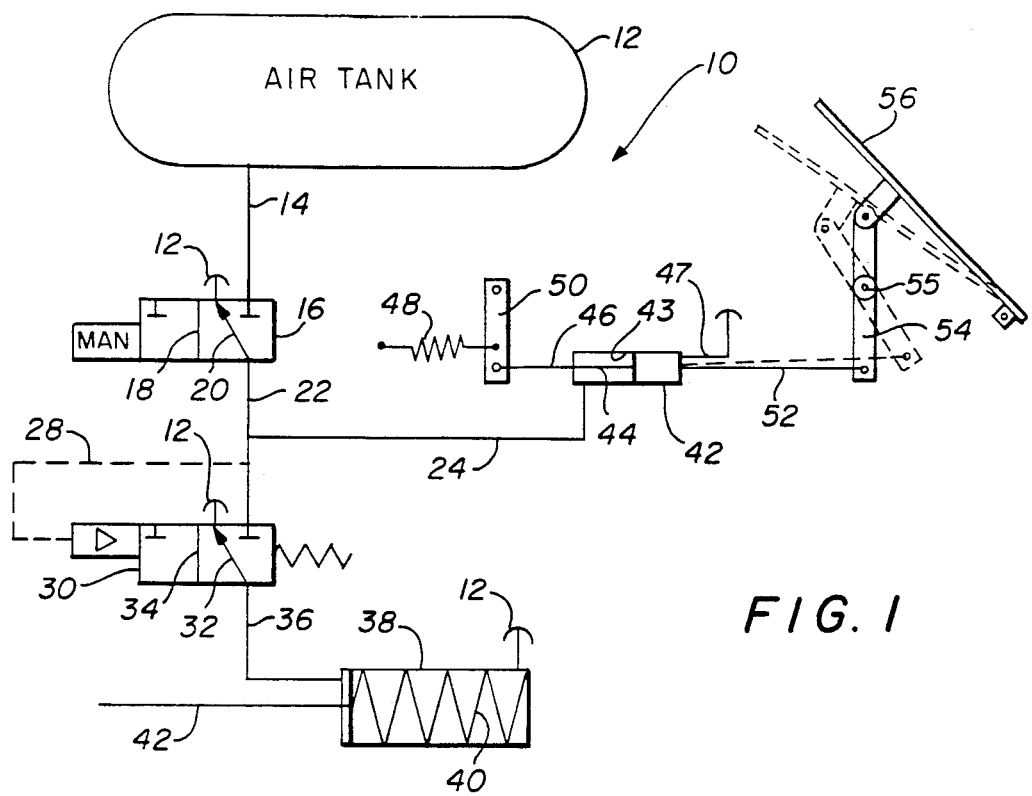
FIG. 1 of the drawing schematically illustrates the parking brake-throttle interlock of the present invention, with the parking brake in an "ON" mode.

Referring now to the drawing, there is schematically illustrated a preferred embodiment of the brake-throttle interlock in accordance with the present invention. In particular, the throttle-parking brake interlock system 10 includes a tank 12 serving as a source of pressurized fluid. The fluid may be air or other types of gas such as nitrogen, or may be hydraulic. Conduit 14 is connected to tank 12 and supplies the fluid from the tank to a first control valve 16. As shall be more fully explained hereinafter, valve 16 is manually operated. The valve includes internal conduits 18 and 20.

Conduit 22 is connected to the downstream side of valve 16. Conduit 22 is in turn connected to conduits 24 and 28. Conduit 22 terminates at fluid operated valve 30. Valve 30 includes internal conduits 32 and 34.

Conduit 36 communicates with valve 30 and terminates at a parking brake actuating mechanism 38. Mechanism 38 includes spring 40 and an operating linkage 42 which is in turn connected to a parking brake (not shown) of a vehicle.

Conduit 24 connected to conduit 22, terminates at housing 42 defining a cylinder 43. A piston-like member 44 is movably mounted within housing 42. As illustrated, fluid is delivered through conduit 24 to the rod side of the piston-like member 44. Conduit 47 vents the piston-side of cylinder 43 to the atmosphere.

A first operating mechanism or linkage 46 is connected to piston-like member 44. A second operating mechanism or linkage 52 is connected to housing 42. Operating mechanism 46, in turn, is connected to the throttle mechanism 50 for controlling the speed of the vehicle's engine (not shown). A spring 48 is connected to throttle mechanism 50 to maintain the engine speed at a predetermined level for example idle, when no other force is applied.

Operating mechanism 52 is connected to link 54 which, in turn, is connected to mechanism 56 which is under control of the vehicle operator. Link 54 is pivotally mounted about pivot 55. Mechanism 56 may be the typical foot pedal found in a vehicle used to control the vehicle's speed.

The parking brake-throttle interlock illustrated in FIG. 1 is shown in the "parking brake on" mode of operation. In this mode of operation, valve 16 prevents any flow of fluid from conduit 14 to conduit 22. In addition, conduit 20 is connected to conduit 22 and drains fluid from the conduit back to tank 12. Likewise, valve 30 prevents any fluid flow from conduit 22 to conduit 36. Conduit 32 communicates with conduit 36 to drain all fluid from the conduit back to tank 12.

In the absence of fluid pressure on parking brake actuating mechanism 38, spring 40 forces the parking brake operating linkage 42 to the left to engage the parking brake (not shown).

Internal conduit 20, in addition to draining fluid from conduit 22, also drains fluid in conduit 24. The foregoing eliminates any fluid pressure existing within housing 42 on the rod side of piston-like member 44.

In the event the vehicle operator or someone else were to inadvertently attempt to increase the vehicle's engine speed by depressing pedal 56, while the parking brake is engaged, the resultant pivoting movement of link member 54 about pivot 55 moves operating mechanism 52 to the right as illustrated. This in turn moves housing 42 to the right. However, since fluid pressure within the housing has been eliminated, the housing is free to move relative to the piston-like member 44. Since piston-like member 44 remains stationary, even though housing 42 has moved to the right, operating mechanism 46 remains stationary under control of spring 48. Spring 48, in turn, maintains the speed of the engine at a predetermined level, for example, idle.

Figure 2:
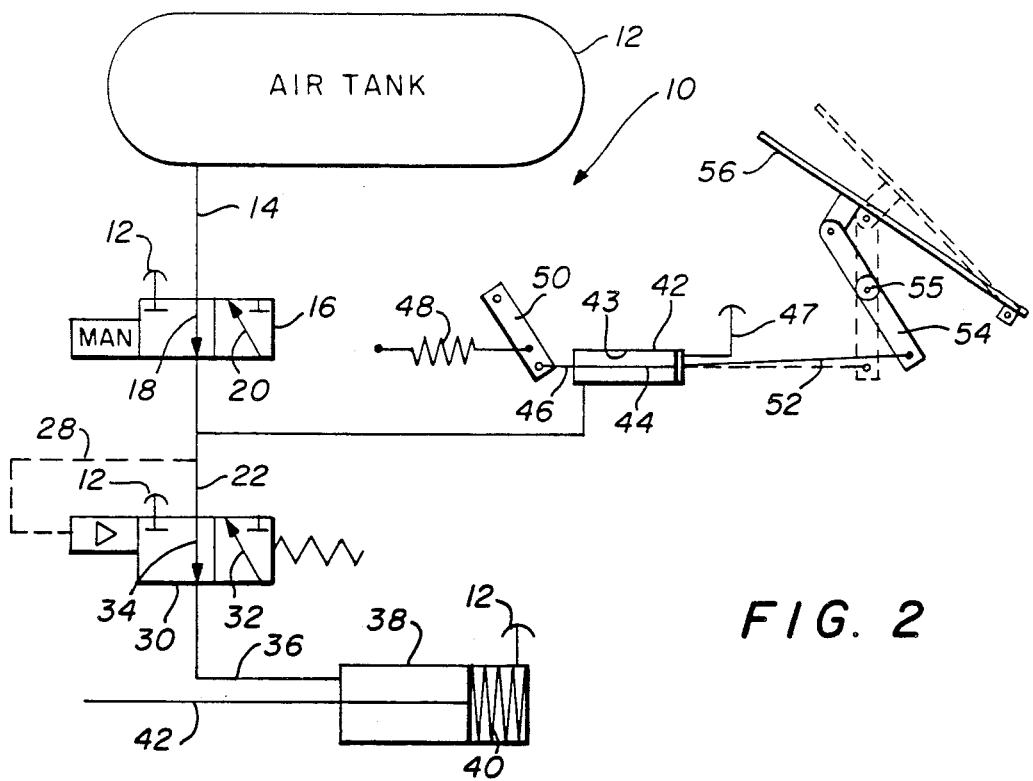
FIG. 2 is a view similar to FIG. 1 with the parking brake in an "OFF" mode.

Let us assume now that the operator of the vehicle wishes to intentionally move the vehicle forward. With the parking brake engaged, it is necessary that the operator manually place valve 16 in a position such that conduit 18 communicates with conduits 14 and 22. FIG. 2 illustrates the various components of system 10 in their brake "OFF" mode of operation. Fluid thus flows from tank 12 to valve 30 through conduit 22. With conduit 18 in communication with conduits 14 and 22, conduit 20 of valve 16 no longer communicates with tank 12.

The fluid pressure in conduit 22 provides a force through conduit 28 to move valve 30 so that conduit 34 communicates with conduits 22 and 36. In this new position, conduit 32 no longer communicates with tank 12. The fluid pressure now delivered through conduit 36 provides a force to overcome the force of spring 40 in actuating mechanism 38 and moves operating linkage 42 to the right to disengage the parking brake.

In addition, fluid is supplied by conduit 24 to bore 43 defined within housing 42. As noted previously, the fluid is furnished to the rod side of piston-like member 44. When the operator depresses mechanism 56 to pivot link 54 about pivot 55 in a counterclockwise direction to increase the speed of the engine, the fluid pressure within bore 43 prevents relative movement between housing 42 and piston-like member 44, and converts the housing-piston-like member assembly into a solid link. Thus, the movement of operating linkage 52 towards the right also results in the movement of operating linkage 46 connected to piston-like member 44 to the right, whereby the force provided by spring 48 is overcome and the engine speed control mechanism operates through throttle mechanism 50 to increase the speed of the engine in a manner well known to those skilled in the art.

The throttle and parking brake interlock system of the present invention essentially uses fluid pressure to control the interconnection between the operator control throttle mechanism and the mechanism attached to the engine for regulating engine speed. With the parking brake in a deactuated position, fluid pressure places the combination of the housing and piston-like member into a first operating mode to connect the operator controlled and engine speed regulating throttle mechanisms. When the brake is actuated, the supply of fluid is terminated and, in the absence of fluid pressure in the bore of the housing, the housing-piston-like member is placed in a second operating mode to effectively disconnect the operator control throttle mechanism from the engine speed regulating throttle mechanism. The system of the present invention is relatively impervious to mechanical problems or damage, is relatively simple to install, and automatically returns the engine to any predetermined engine speed, as for example, idle, when the parking brake is actuated, regardless of the position of the accelerator or the speed of the engine at the time the parking brake is actuated.

While a preferred embodiment of the present invention has been described and illustrated, the invention should not be limited thereto but may be otherwise embodied within the scope of the following claims.

The embodiments of the invention in which an exclusive property or privilege is claimed are defined as follows:

1. A cable operated throttle for the primary engine of a vehicle having a parking brake interlock for retaining the engine at a predetermined speed until the parking brake is released comprising;

parking brake actuating means;

fluid supply means connected to said parking brake actuating means;

means for controlling the supply of fluid to said parking brake actuating means;

means for retaining the parking brake actuating means in a parking brake engaged position in the absence of fluid supply thereto;

said cable operated throttle including first operating means connected to a vehicle operator control mechanism and second operating means connected to an engine speed control mechanism;

linkage means interposed between the first and second operating means having a first operating mode for effectively connecting said first and second operating means, and a second operating mode for effectively disconnecting said first and second operating means; and means responsive to the supply of fluid to said parking brake actuating means to place said linkage means in its first operating mode when fluid is supplied to said parking brake actuating means and in said second operating mode when the supply of fluid is discontinued.

2. A cable operated throttle in accordance with claim 1 wherein said linkage means includes a first generally cylindrical housing, and a piston-like member movably mounted within a bore defined by said housing.

3. A cable operated throttle in accordance with claim 2 wherein said housing is movable relative to said piston-like member, said housing being connected to said first operating means and said piston-like member is connected to said second operating means.

4. A cable operated throttle in accordance with claim 3 wherein said fluid supply responsive means includes a fluid conduit having one end connected to said fluid supply means and the other end connected to said housing for delivering fluid into said bore.

5. A cable operated throttle in accordance with claim 2 wherein said fluid supply responsive means includes a fluid conduit having one end connected to said fluid supply means and the other end connected to said housing for delivering fluid into said bore.

6. A system for interlocking the throttle and parking brake of a vehicle for maintaining the vehicle engine at a predetermined speed when the parking brake is actuated comprising:
- parking brake actuating means connected to said parking brake;
- control means connected to said parking brake actuating means including means to selectively generate a first force for releasing said brake and means to generate a second force for actuating said brake in the absence of said first force;
- first operating means joined to a first throttle mechanism controlled by the vehicle operator and second operating means joined to a second throttle mechanism controlling the speed of the engine;
- selectively operable linkage means interposed between the first and second operating means and operably connected to said first force generating means for effectively connecting said first and second operating means when the first force is generated, and for effectively disconnecting said first and second operating means in the absence of said first force; and
- means for maintaining the engine at a predetermined speed when the first and second operating means are effectively disconnected from each other.

7. A system in accordance with claim 6 wherein said linkage means includes a first generally cylindrical housing, and a piston-like member movably mounted within a bore defined by said housing.

8. A system in accordance with claim 7 wherein said housing is movable relative to said piston-like member, said housing being connected to said first operating means and said piston-like member being connected to said second operating means.

* * * * *